May 5, 1959 P. F. ASHWOOD 2,885,159
AIRCRAFT HAVING ORIENTABLE JET NOZZLE ARRANGEMENT
Original Filed June 19, 1953 3 Sheets-Sheet 1

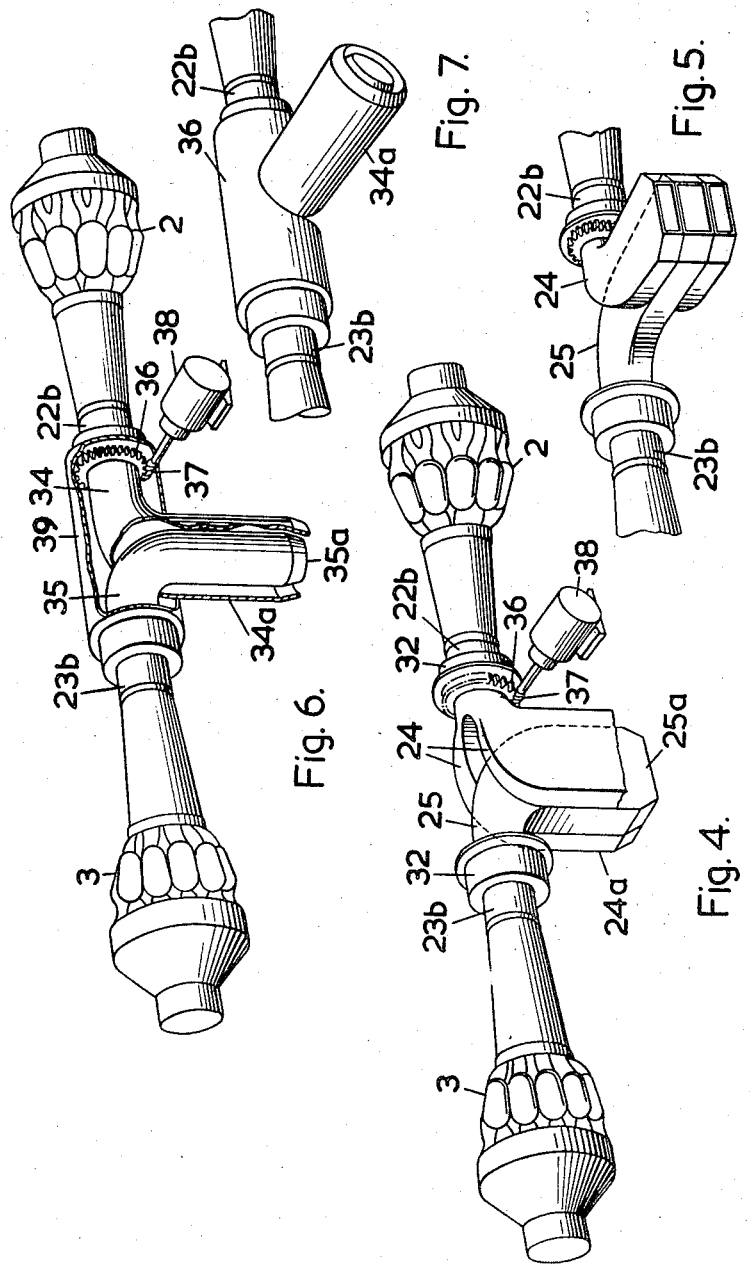

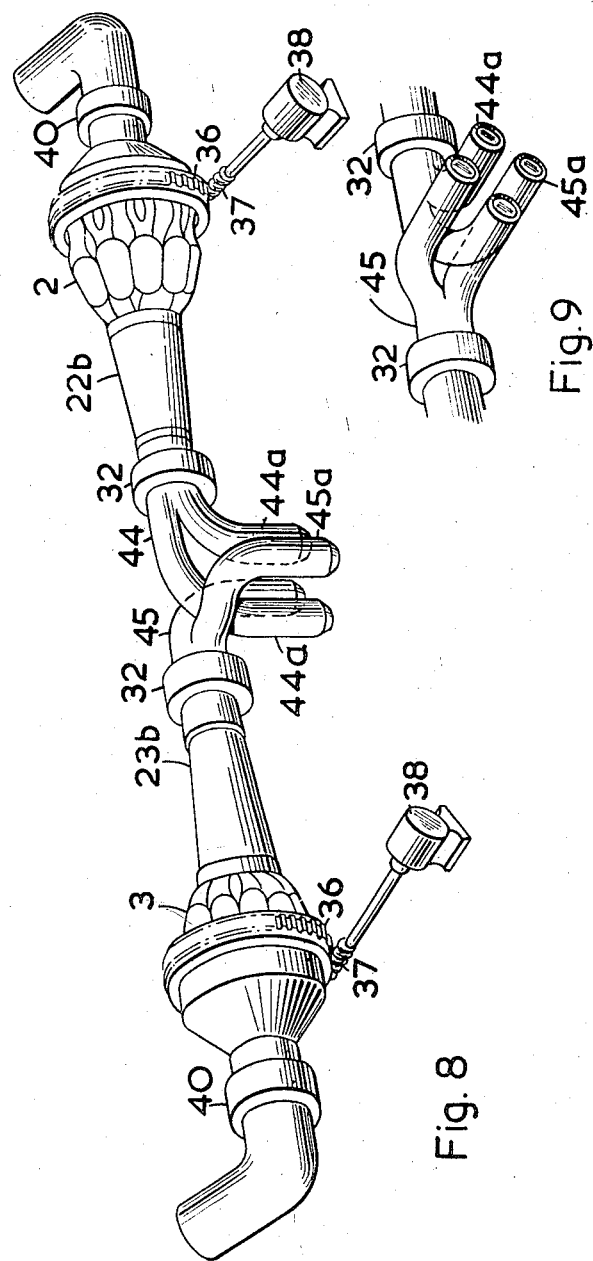

United States Patent Office 2,885,159
Patented May 5, 1959

2,885,159

AIRCRAFT HAVING ORIENTABLE JET NOZZLE ARRANGEMENT

Peter Frederick Ashwood, Farnham, England, assignor to Power Jets (Research and Development) Limited, London, England, a British company Continuation of abandoned application Serial No. 362,930, June 19, 1953. This application September 26, 1956, Serial No. 612,163

Claims priority, application Great Britain June 27, 1952

13 Claims. (Cl. 244—12)

In an aircraft wherein thrust is produced by the discharge of a jet of gas it may be desired to direct a jet rearwardly for normal forward flight and downwardly on occasion for giving an upthrust or at least a component of upthrust when desired for maintaining flight during relatively slow speed landing of high speed aircraft or for assisting take-off. Again, if jet streams from separate gas-generating power units are discharged through at least two separate but adjacent jet nozzles so as to form in effect a single jet, it may be desirable or necessary that the line of action of the total thrust should not change appreciably if one of the power units goes out of operation.

According to the principal feature of the present invention a jet nozzle is fed through a right-angled or approximately right-angled bend from a jet pipe having at least a part lying transversely across the aircraft.

According to a further feature of the invention, where there are two jet nozzles separately supplied as aforesaid, the nozzles are so arranged that the thrust on one has substantially the same line of action as that on the other—i.e. according to the invention two or more jet nozzles are each symmetrically disposed about an axis common to both; furthermore the two nozzles may each be fed through a right-angled or approximately right-angled bend from two jet pipes lying in part on a common axis extending transversely across the aircraft. More particularly, one nozzle embraces another, at least partially. At least one nozzle may be divided into branches disposed about or interleaved with at least part of another nozzle.

Although applicable to rearwardly directed nozzles for the production of forward thrust, the feature of the nozzle construction is particularly valuable when applied to a downwardly directed nozzle for producing an upthrust or a thrust having an upward component, because it is important that upthrust should at all times act along a line passing through or very near to the centre of gravity of the aircraft. The feature may be applied to nozzles equipped for jet deflection whereby, in power plant normally emitting a rearwardly directed jet for producing forward propelling thrust on the aircraft, the jet may be diverted downwardly to produce upthrust, or at least a component of upthrust, when desired.

Thus according to a further and important feature of the invention provision is made for swivelling the right-angled bend and possibly also the nozzle, or the combination of nozzles symmetrically disposed about a common axis; the swivelling is around the axis of the jet pipe or jet pipes from a position in which the nozzle or assembly of nozzles is rearwardly directed to a position in which they are downwardly directed. The power unit or whole assembly of power units may swivel with the jet nozzles about the axis transverse to the aircraft. Alternatively the nozzle or nozzles may swivel relatively to the jet pipe or pipes in which case there is included a rotary gas-tight joint between each jet pipe and right-angled bend.

The invention is illustrated by the accompanying drawings of which:

Figures 4 and 5 are views to a larger scale showing two positions of one construction of swivelling interleaved jet nozzles according to the arrangement of Figure 3;

Figures 6 and 7 are views corresponding to Figures 4 and 5 of an alternative construction;

Figures 8 and 9 are two further similar views of another alternative construction in which also the whole power assembly is mounted for swivelling about a common transverse axis.

Figure 1:
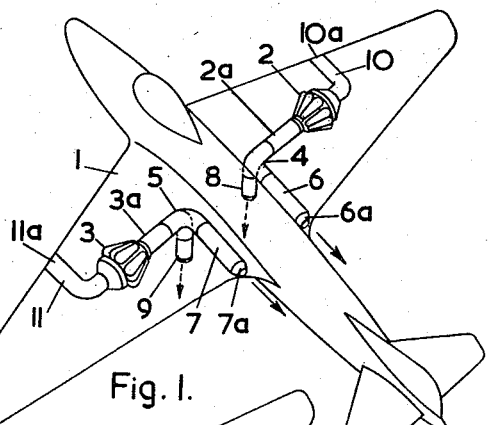
Figure 1 shows the arrangement of two engines and swivelling nozzle connections on an aircraft.

In Figure 1 the power plant for the aircraft 1, intended for the production of forward thrust or upthrust as desired, consists of two separate gas generating power units—i.e. jet engines—2 and 3 of conventional form mounted with their jet pipes 2a and 3a in line on a common horizontal axis extending transversely across the aircraft. Although it is understood that these jet pipes could extend away from each other from opposite ends of the engines 2 and 3, which engines would then draw in air from intakes at their adjacent ends, the jet pipes 2a and 3a are shown as extending towards each other from adjacent ends of the engine, pointing towards each other. The engines draw in air from the intake elements 10 and 11 having forward facing intakes 10a and 11a. Each of the jet pipes 2a and 3a terminates in a right-angled pipe bend 4 or 5. For normal flight the pipe bends 4 and 5 are aligned with and connected to the nozzle pipes 6 and 7 terminating in the usual convergent nozzles 6a and 7a.

Rotation of the pipe bends 4 and 5 about the common axis of the jet pipes 2a and 3a through a right-angle will direct them downwardly as shown so that they are aligned with and connected to the downwardly directed convergent nozzles 9 and 10. Swivelling mechanism for rotating the pipe bends either relatively to or bodily with the whole assembly of engines 2 and 3 is as described in more detail hereinafter. The axes of the nozzles 9 and 10 are symmetrically disposed about the longitudinal centre line of the aircraft, such that the resultant of the action of the jet therefrom will pass through or very near to the centre of gravity of the aircraft.

It will be understood that in Figure 1, as in Figures 2 and 3 to be later described, the aircraft is shown conventionally in outline and as if transparent so that the power plant in the wing is fully exposed to view.

Figure 2:
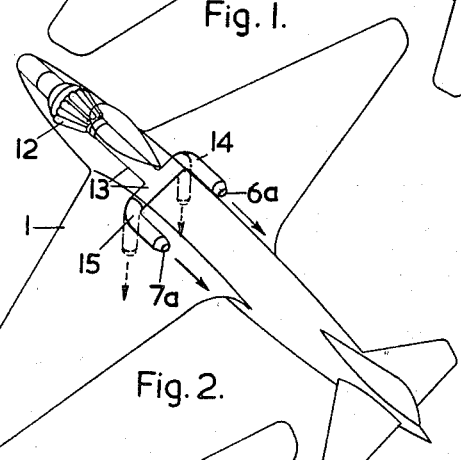
Figure 2 shows a single engine arrangement on an aircraft feeding two swivelling nozzle connections.

In Figure 2 the aircraft 1 has a forwardly and centrally mounted jet engine 12 extending along the direction of flight and discharging rearwardly through the T-shaped jet pipe 13. The butt of the T lies transversely across the aircraft and is connected at each end to right-angled swivelling pipe bends 14 and 15 terminating in convergent nozzles 6a and 7a. When the latter lie in the plane of the T-shaped jet pipe 13 as shown, they are directed rearwardly. Rotation of the pipe bends 14 and 15 about the axis of the butt of the T through a right-angle will direct the nozzles downwardly as shown in chain dotted line.

In order to ensure that with only two engines, as for example in Figure 1, failure of one engine will not appreciably unbalance the upthrust, the transversely extending jet pipe portions may extend up to each other and lead to sub-divided and interleaved swivelling units each disposed symmetrically about the centre line such that when they are downwardly directed the line of action of the jet from either nozzle acting alone will pass through or very near to the centre of gravity of the aircraft.

Figure 3:
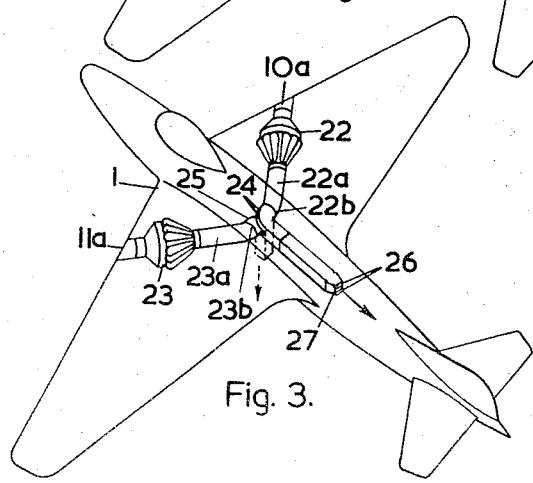
Figure 3 shows two engines arranged on an aircraft similarly to the arrangement shown in Figure 1 but with the nozzles disposed around a common axis.

Thus in Figure 3 in which the engines 22 and 23 are shown as lying along the limbs of a V, having the pipe bends and nozzle unit at the apex, the inclined jet pipes 22a and 23a have portions 22b and 23b extending in line with each other transversely across the aircraft 1 to the pipe bends 24 and 25 which can swivel about the common axis of parts 22b and 23b. The engines of course draw in from the forwardly facing intakes 10a and 11a.

One form of interleaved nozzle unit for use in the arrangement according to Figure 3 is shown to a larger scale in detail in Fig. 4. Each of the circular section jet pipe portions 22b and 23b terminates in pipe bends 24 and 25 each of which first merges from circular into rectangular section and then turns smoothly downwardly from the horizontal, through 90°, at a position between the two power units. The downward rectangular section of pipe bend 24 is bifurcated to form two equal rectangular branches 24a lying against and on opposite sides of the downwardly directed rectangular part 25a of the pipe bend 25, and terminating in a divided convergent nozzle with more than one aperture. It will be seen that the divided nozzle partly embraces at least a part of the other nozzle constituted by pipe bend 25, the whole forming a pair of nozzles one having an even number and the other an odd number of layers which are sandwiched or interleaved, the layers lying along the direction of the common axis; the centre line of each of the two jets is the centre line of the middle layer. Such an arrangement will provide upthrust along the same line with two or only one jet pipe and nozzle in action. If the pipe bends 24 and 25 be mounted for swivelling about a horizontal axis, such as the common axis of the two power units 2 and 3 of Figure 1, the assembly can be tilted so that the jets are inclined to the vertical to produce components of upthrust and of side thrust on the transverse parts of the pipe bends, which latter thrust is a forward thrust on the aircraft. They may be swivelled through 90° to the position shown in Fig. 5. The pipe unit swivels about the ends of the jet pipe portions 23b and 22b within casings 32 which provide the bearings and gas tight swivelling joints. For effecting the swivelling a worm wheel 36 is secured to one of the pipe bends and meshes with the worm 37 rotated by the rotary actuating motor 38.

In the modification shown in Figs. 6 and 7, which gives a jet of circular section, the nozzle apertures are concentric, one nozzle aperture being circular and the other an annulus around the first. Thus the jet pipe portion 22b terminates in the pipe bend 34 which enlarges and bends over to form the outer wall of the annulus and terminates in the circular section convergent nozzle 34a. The second pipe bend 35 of constant cross section passes through and is joined to the wall of bend 34, one end joining on to the inner convergent nozzle 35a and the other to the jet pipe portion 23b. Again the whole arrangement is mounted for swivelling by means of a worm-wheel 36, the worm 37 and the rotary actuator 38. The unit that swivels is now enclosed within the fixed casing 39 which is slotted to allow the unit to swivel from the downward position shown in Figure 6 through 90° to the horizontal position shown in Figure 7.

In a further modification shown in Figures 8 and 9 the jet pipe portions 22b and 23b terminate respectively in pipe bends 44 and 45 each of which is divided into the same number of branches as the other—e.g. is bifurcated into branches 44a and 45a—and all the branches curve downward to constitute two downwardly directed bifurcated contracting jet nozzles with their apertures disposed symmetrically around a common vertical axis; thus apertures of the nozzle connected to one jet pipe alternate with those of the nozzle connected to the other jet pipe. The cross section of each branch of the bifurcated downward nozzles can be circular as shown or of sector or other form. With the arrangement as shown in the position of Figure 8, only upthrust is provided. If the whole assembly of power units 2 and 3 with the jet pipe bends and possibly also nozzles be mounted for swivelling about a horizontal axis, shown as the common axis of the two power units 2 and 3 which are in line, this complete assembly can be tilted as previously described for the pipe bend assembly to produce upthrust or forward thrust or components of each as aforesaid. Provision may be made for swivelling through 90° to the position shown in Figure 9. For this swivelling the assembly may be mounted in casing 40 at each end and at each end there may be a worm-wheel 36 driven by a worm 37 the worms being driven by the synchronised rotary actuators 38. This arrangement of swivelling has the advantage over that described with reference to Figures 4 and 5 or Figures 6 and 7 in that the swivelling mounting is in each case in a relatively cool place. Bearing casings 32 are also provided.

With the jet pipe and nozzles assemblies as described with reference to Figures 4 to 9 failure of one power unit will not appreciably affect the direction of the upthrust produced by the downwardly directed jet which can therefore still pass through or near to the centre of gravity of the aircraft. It will be seen from the arrangement described that the nozzles themselves may swivel. Alternatively and as shown in Figure 3 there may be two sets of nozzles one directed downwardly and the other (26, 27) rearwardly with provision for deflecting the jet from one to the other. In any of the described and illustrated arrangements each of the power units such as 2, 3, 12, 22 and 23 can be and is shown externally as a turbo jet engine of some form—i.e. a unit including an air compressor, a gas turbine driving this compressor, and a combustion system wherein the fuel is burnt in air received from the compressor to generate combustion gases which serve to drive the turbine and which pass through the jet pipes to form the thrust-producing jet. It will however be understood that this is immaterial to the invention and that other forms of jet producing units may be used.

This is a continuation of United States patent application Serial No. 362,930 filed June 19, 1953, which is now abandoned.

I claim:

1. An aircraft comprising two jet engines, each having a jet pipe; two nozzle units for the discharge of propulsive jet streams, each unit terminating in at least one jet discharge aperture; and means connecting each jet pipe to a separate one of said nozzle units; the discharge apertures of said nozzle units being so symmetrically disposed about an axis common to both that said jet streams from each of said nozzle units have the same line of action, whereby if one engine is out of operation, the line of action of the total thrust is not changed.

2. An aircraft comprising two jet engines, each having a jet pipe; two nozzle units for the discharge of propulsive jet streams, one unit terminating in a jet discharge aperture and the other unit being divided into branches lying one on each side of at least part of the other nozzle unit and each terminating in a jet discharge aperture; and means connecting each jet pipe to a separate one of said nozzle units; the discharge apertures of the second-mentioned unit being symmetrically disposed one on each side of the discharge aperture of the first-mentioned unit so that the jet streams from each of said nozzle units have substantially the same line of action, whereby if one engine is out of operation, the line of action of the total thrust is not changed appreciably.

3. An aircraft comprising two jet engines, each having a jet pipe; two nozzle units for the discharge of propulsive jet streams, one unit having at least one part of rectangular cross-section terminating in a rectangular jet discharge aperture, and the other unit being divided into at least two branches of rectangular cross-section each terminating in a rectangular jet discharge aperture, said branches lying one on each side of said rectangular part of the first nozzle unit; and means connecting each jet pipe to a separate one of said nozzle units; the jet discharge apertures of the two nozzle units being interleaved in layers and symmetrically disposed with respect to an axis common to both so that the jet streams from each of the nozzle units have substantially the same line of action, whereby if one engine is out of operation, the line of action of the total thrust is not changed appreciably.

4. An aircraft comprising two jet engines, each having a jet pipe; two nozzle units for the discharge of propulsive jet streams, each unit terminating in a jet discharge aperture; and means connecting each jet pipe to a separate one of said nozzle units; one nozzle unit at least partly enclosing the other unit and terminating in an annular jet discharge aperture concentric with and around the jet discharge aperture of the other unit so that the jet streams from each of the nozzle units have substantially the same line of action, whereby if one engine is out of operation, the line of action of the total thrust is not changed appreciably.

5. An aircraft comprising two jet engines, each having a jet pipe; two nozzle units for the discharge of propulsive jet streams, each unit being divided into branches, each branch terminating in a jet discharge aperture; and means connecting each jet pipe to a separate one of said nozzle units; the jet discharge apertures of each nozzle unit being so symmetrically disposed about an axis common to both that the jet streams from each of the nozzle units have substantially the same line of action, whereby if one engine is out of operation, the line of action of the total thrust is not changed appreciably.

6. An aircraft according to claim 5 wherein the nozzle units are divided into equal numbers of branches, and the jet discharge apertures of the two units are disposed alternately in a ring around said common axis.

7. Aircraft power plant for discharging a jet of gas to produce thrust comprising at least one jet engine and a jet pipe extending therefrom transversely across the aircraft, a jet nozzle, a connection between said jet pipe and said nozzle in the form of a substantially right-angled pipe bend and means mounting said engine, jet pipe and pipe bend for swivelling about the axis of said jet pipe extending transversely across the aircraft, the pipe bend being, by virtue of said swivelling, movable from a position for directing the jet downwardly to one for directing the jet rearwardly.

8. An aircraft comprising two jet engines, each having a jet pipe lying transversely across the aircraft; two nozzle units for the discharge of propulsive jet streams, each unit terminating in a jet discharge aperture; two substantially right-angled pipe bends, each connecting one of said jet pipes to one of said nozzle units; the discharge apertures of said nozzle units being so symmetrically disposed about an axis common to both that said jet streams from each of said nozzle units have the same line of action, whereby if one engine is out of operation, the line of action of the total thrust is not changed.

9. An aircraft according to claim 8 wherein one pipe bend and the nozzle unit connected thereto are divided into branches, each terminating in a jet discharge aperture, at least part of the other pipe bend and the nozzle unit connected thereto lying between the branches.

10. An aircraft according to claim 8 wherein at least one pipe bend and the nozzle unit connected thereto are divided into branches and the pipe bends and nozzle units have parts interleaved in layers.

11. An aircraft according to claim 8 wherein the discharge aperture of one nozzle unit is annular and concentric with and around the discharge aperture of the other nozzle unit and said first-mentioned nozzle unit and the pipe bend to which it is connected at least partly encloses the other nozzle unit and pipe bend.

12. An aircraft according to claim 8 wherein each said pipe bend and nozzle unit is divided into an equal number of branches and the jet discharge apertures of the two units are disposed alternately in a ring around said common axis.

13. An aircraft according to claim 8 wherein said jet pipes are aligned on a common axis and comprising means connecting said pipe bends to said jet pipes for turning them about said axis.

References Cited in the file of this patent
UNITED STATES PATENTS
2,601,104    Douglas _____ June 17, 1952